(12) United States Patent
Wittig et al.

(10) Patent No.: US 8,489,280 B2
(45) Date of Patent: *Jul. 16, 2013

(54) SYSTEM AND METHOD FOR DETERMINING AN ABSOLUTE ROTATIONAL POSITION OF A VEHICLE HANDWHEEL

(75) Inventors: William H. Wittig, Saginaw, MI (US); Kathryn L. Pattok, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1308 days.

This patent is subject to a terminal disclaimer.

(21) Appl. No.: 11/930,830

(22) Filed: Oct. 31, 2007

(65) Prior Publication Data

US 2009/0112403 A1 Apr. 30, 2009

(51) Int. Cl.
*A01B 69/00* (2006.01)
(52) U.S. Cl.
USPC .............................. 701/41; 180/446
(58) Field of Classification Search
USPC .......... 701/1, 33, 35, 36, 41, 84, 87; 180/401, 180/402, 444, 446
See application file for complete search history.

(56) References Cited

U.S. PATENT DOCUMENTS

| 4,890,683 | A | * | 1/1990 | Matsuda et al. | 180/444 |
| 5,887,671 | A | * | 3/1999 | Yuki et al. | 180/68.1 |
| 2004/0094351 | A1 | * | 5/2004 | Higashi et al. | 180/402 |

* cited by examiner

*Primary Examiner* — Gertrude Arthur Jeanglaude
(74) *Attorney, Agent, or Firm* — Cantor Colburn LLP

(57) ABSTRACT

A system and a method for determining an absolute rotational position of the vehicle handwheel are provided. In one exemplary embodiment, a method includes monitoring an amount of torque applied to the vehicle handwheel. The method further includes monitoring a rotational speed of the vehicle handwheel. The method further includes setting an absolute position value indicating the absolute position of the vehicle handwheel equal to a predetermined steering travel limit of the vehicle handwheel when both the amount of torque applied to the vehicle handwheel is greater than or equal to a threshold torque level, and the rotational speed of the vehicle handwheel is less than or equal to a threshold rotational speed. The method further includes storing the absolute rotational position value in a memory device.

4 Claims, 2 Drawing Sheets

SYSTEM AND METHOD FOR DETERMINING AN ABSOLUTE ROTATIONAL POSITION OF A VEHICLE HANDWHEEL

BACKGROUND

A vehicle has utilized an absolute position sensor to measure a position of a vehicle handwheel. However, a disadvantage with utilizing the absolute position sensor is that the absolute position sensor is relatively expensive to utilize in the vehicle.

SUMMARY

A method for determining an absolute rotational position of a vehicle handwheel in accordance with an exemplary embodiment is provided. The method includes monitoring an amount of torque applied to the vehicle handwheel. The method further includes monitoring a rotational speed of the vehicle handwheel. The method further includes setting an absolute position value indicating the absolute position of the vehicle handwheel equal to a predetermined steering travel limit of the vehicle handwheel when both the amount of torque applied to the vehicle handwheel is greater than or equal to a threshold torque level, and the rotational speed of the vehicle handwheel is less than or equal to a threshold rotational speed. The method further includes storing the absolute rotational position value in a memory device.

A system for determining an absolute rotational position of a vehicle handwheel in accordance with another exemplary embodiment is provided. The system includes a torque sensor configured to generate a first signal indicative of an amount of torque applied to the vehicle handwheel. The system further includes a position sensor operably coupled to a steering assist motor. The steering assist motor is further operably coupled to the vehicle handwheel. The position sensor is configured to generate a second signal indicative of a relative position of the vehicle handwheel. The system further includes a microprocessor configured to receive the first and second signals from the torque sensor and the position sensor, respectively. The microprocessor is further configured to determine the amount of torque applied to the vehicle handwheel based on the first signal. The microprocessor is further configured to determine a rotational speed of the vehicle handwheel based on the second signal. The microprocessor is further configured to set an absolute position value indicating an absolute position of the vehicle handwheel equal to a predetermined steering travel limit of the vehicle handwheel when both the amount of torque applied to the vehicle handwheel is greater than or equal to a threshold torque level, and the rotational speed of the vehicle handwheel is less than or equal to a threshold rotational speed. The microprocessor is further configured to store the absolute rotational position value in a memory device.

DESCRIPTION OF EXEMPLARY EMBODIMENTS

Figure 1:
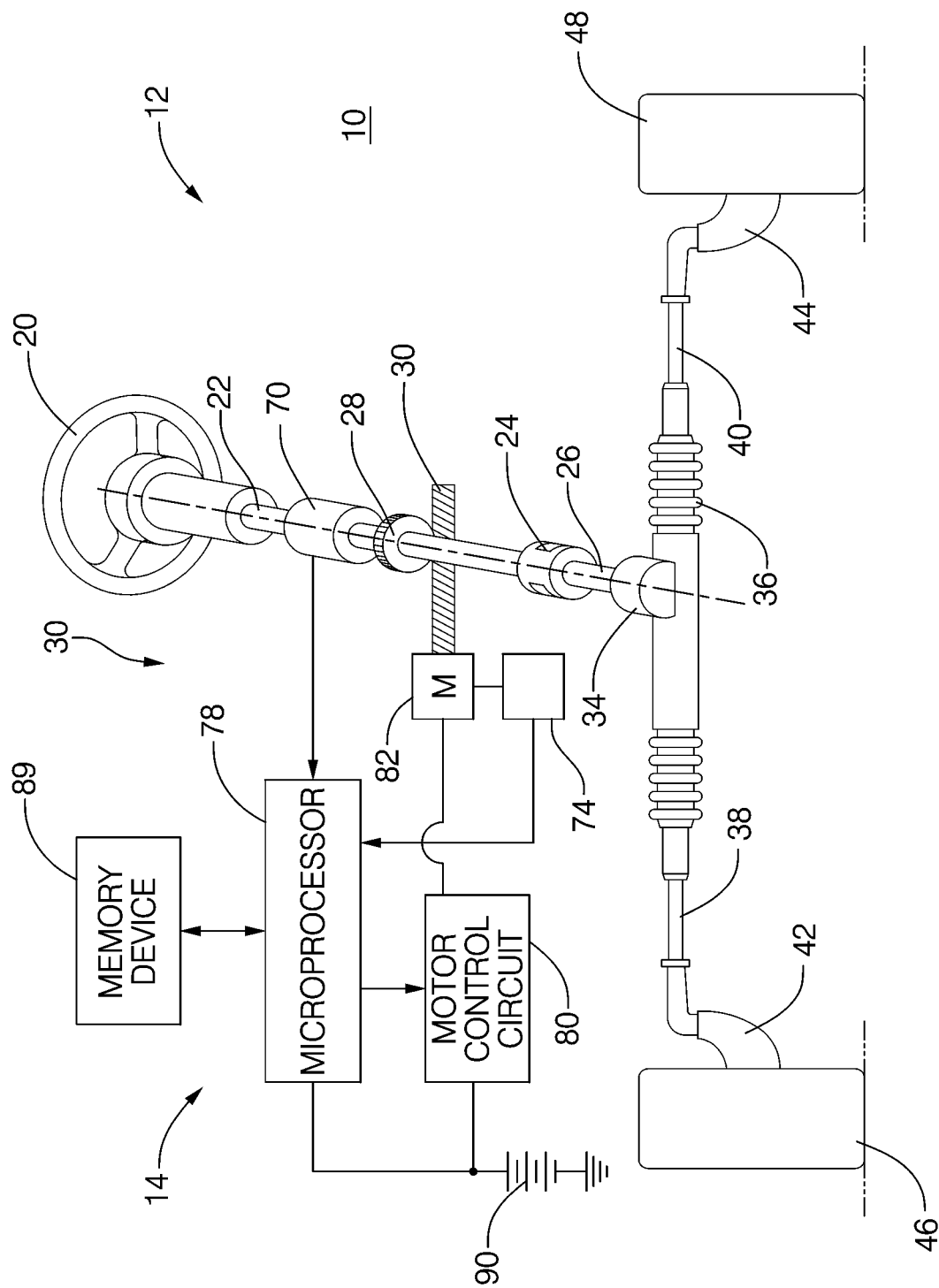
FIG. 1 is a schematic of a vehicle having a steering system and a control system in accordance with an exemplary embodiment.

Referring to FIG. 1, a vehicle 10 having a steering system 12 and a control system 14 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

The steering system 12 is provided to steer the vehicle 10 in a desired direction. The steering system includes a handwheel 20, an upper steering column 22, a universal joint 24, a lower steering column 26, a worm gear 28, a worm 30, a gear housing 34, a steering mechanism 36, tie rods 38, 40, steering knuckles 42, 44, and roadway wheels 46, 48. In one exemplary embodiment, the steering system 12 is an electric power steering system that utilizes a rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering column 22 connected to the lower steering column 26 turns the pinion gear. Rotation of the pinion gear moves the toothed rack which moves the tie rods 39, 40 which in turn moves the steering knuckles 42, 44, respectively, which turns the roadway wheels 46, 48, respectively.

It should be noted that the vehicle handwheel 20 has two predetermined steering travel limits. The first predetermined steering travel limit is a full clockwise steering travel limit. The second predetermined steering travel limit is a full counter-clockwise steering travel limit. The first and second predetermined steering travel limits can be quantified in angular degrees or radians.

The control system 14 is provided to assist in controlling the steering system 12 and to determine an absolute rotational position of the vehicle handwheel 20. The control system 14 includes a column torque sensor 70, a position sensor 74, a microprocessor 78, a motor control circuit 80, and a battery 90.

The steering column torque sensor 70 is provided to generate a signal indicative of an amount of torque being applied to the vehicle handwheel 20 and the upper steering column 22 by a vehicle operator. In one exemplary embodiment, the steering column torque sensor 70 includes a torsion bar (not shown) which outputs a variable-resistance signal to the controller 78 based on an amount of twist of the torsion bar. Of course, in alternative embodiments, other types of torque sensors known to those skilled in the art could be utilized.

The position sensor 74 is provided to generate a signal indicative of a relative rotational or angular position of a rotor of the steering assist motor 82, which is further indicative of a relative rotational position of the vehicle handwheel 20. The position sensor 74 operably communicates with the microprocessor 78.

The microprocessor 78 is provided to generate control signals that are received by the motor control circuit 80 for controlling operation of the steering assist motor 82. The microprocessor 78 is further configured to determine an absolute rotational position of the vehicle handwheel 20, which will be described in further detail below. The microprocessor 78 is electrically coupled to the steering column torque sensor 70, the position sensor 74, and the motor control circuit 80.

The motor control circuit 80 is provided to receive command torque control signals from the microprocessor 78 and to generate electrical currents for controlling operation of the steering assist motor 82. As shown, the motor control circuit 80 is electrically coupled between the microprocessor 78 and the steering assist motor 82. The motor 82 is configured to drive the worm 30 which is operably coupled to the worm gear 28 for moving the lower steering column 26, the steering mechanism 36, tie rods 38, 40, steering knuckles 42, 44, toward an operational position wherein the road wheels 46, 48 have a desired front road wheel angle.

The battery 90 provides electrical power to the microprocessor 78 and to the motor control circuit 80. As shown, the battery 90 is electrically coupled to the microprocessor 78 and to the motor control circuit 80.

Figure 2:
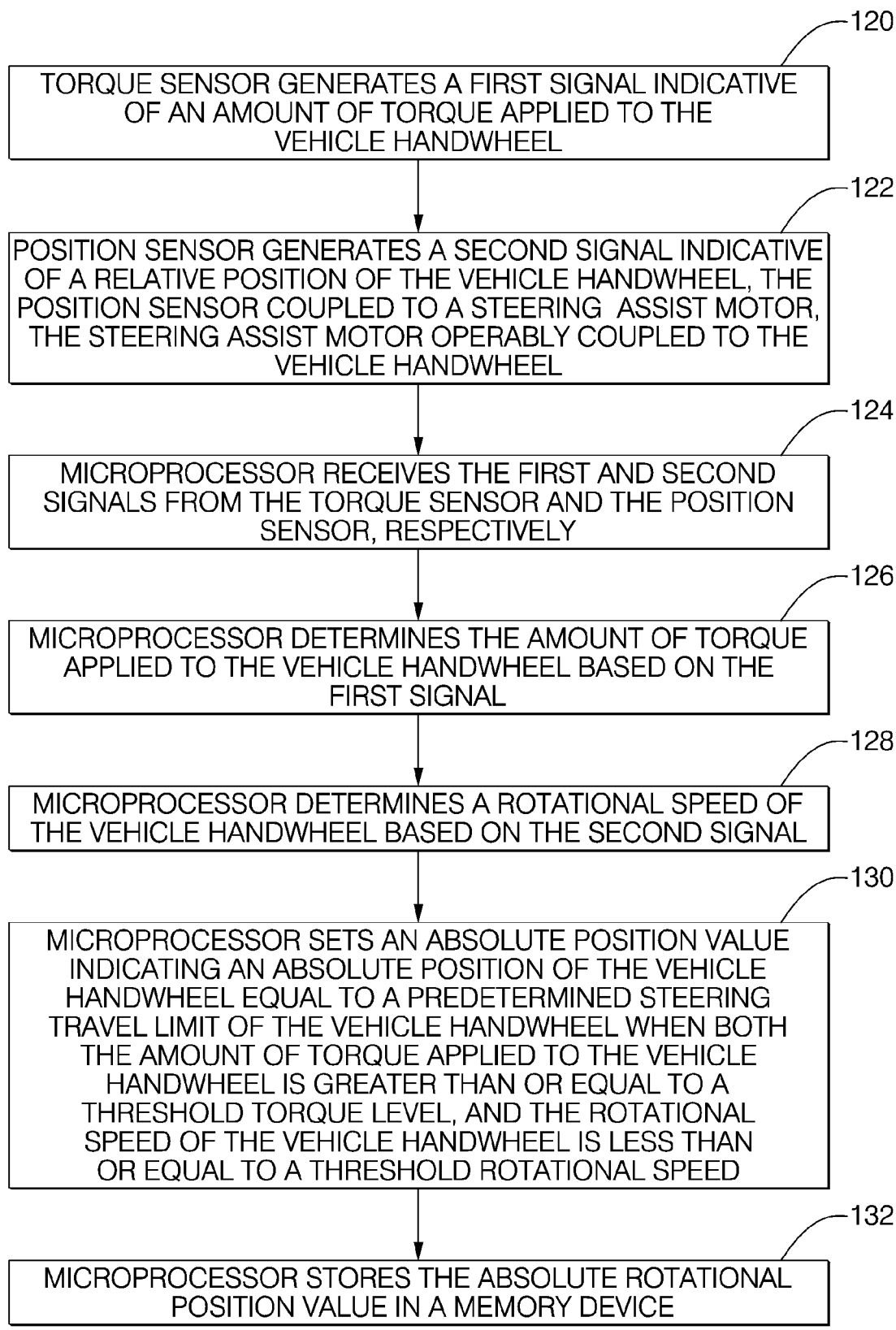
FIG. 2 is a flowchart of a method for determining an absolute rotational position of the vehicle handwheel in accordance with another exemplary embodiment.

Referring to FIG. 2, a flowchart of a method for determining an absolute rotational position of the vehicle handwheel 20 in accordance with another exemplary embodiment will now be explained.

At step 120, the torque sensor 70 generates a first signal indicative of an amount of torque applied to the vehicle handwheel 20.

At step 122, the position sensor 74 generates a second signal indicative of a relative position of the vehicle handwheel 20. The position sensor 74 is coupled to the steering assist motor 82. The steering assist motor 82 is operably coupled to the vehicle handwheel 20.

At step 124, the microprocessor 78 receives the first and second signals from the torque sensor 70 and the position sensor 74, respectively.

At step 126, the microprocessor 78 determines the amount of torque applied to the vehicle handwheel 20 based on the first signal. In one exemplary embodiment, the amount of torque is proportional to an amplitude of the first signal. In another exemplary embodiment, the amount of torque is proportional to the frequency of the first signal.

At step 128, the microprocessor 78 determines a rotational speed of the vehicle handwheel based on the second signal.

At step 130, the microprocessor 78 sets an absolute position value indicating an absolute position of the vehicle handwheel 20 equal to a predetermined steering travel limit of the vehicle handwheel 20 when both the amount of torque applied to the vehicle handwheel 20 is greater than or equal to a threshold torque level, and the rotational speed of the vehicle handwheel 20 is less than or equal to a threshold rotational speed.

At step 132, the microprocessor 78 stores the absolute rotational position value in the memory device 89. After step 132, the method is exited.

The system and the method for determining an absolute rotational position of a vehicle handwheel represent a substantial advantage over other systems and methods. In particular, the system and the method have a technical effect of determining the absolute rotational position of a vehicle handwheel without utilizing an absolute rotational position sensor.

As described above, the above-described method can be embodied at least in part in the form of computer-implemented software algorithms and apparatuses for practicing those processes. In an exemplary embodiment, the method is embodied at least in part in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a microprocessor, the microprocessor becomes an apparatus for practicing the invention.

We claim:

1. A method for determining an absolute rotational position of a vehicle handwheel, comprising:
    monitoring an amount of torque applied to the vehicle handwheel;
    monitoring a rotational speed of the vehicle handwheel;
    comparing the amount of torque applied to the vehicle handwheel to a threshold torque level;
    determining when the amount of torque applied to the vehicle handwheel is greater than or equal to the threshold torque level;
    comparing the rotational speed of the vehicle handwheel to a threshold rotational speed;
    determining when the rotational speed of the vehicle handwheel is less than or equal to the threshold rotational speed;
    setting an absolute rotational position value indicating the absolute rotational position of the vehicle handwheel equal to a predetermined steering travel limit of the vehicle handwheel; and
    storing the absolute rotational position value in a memory device;
    wherein the absolute rotational position value indicates the absolute rotational position of the vehicle handwheel when the amount of torque applied to the vehicle handwheel is greater than or equal to the threshold torque level, and the rotational speed of the vehicle handwheel is less than or equal to the threshold rotational speed.

2. The method of claim 1, wherein the predetermined steering travel limit is at least one of a predetermined clockwise steering travel limit and a predetermined counter-clockwise steering travel limit.

3. A system for determining an absolute rotational position of a vehicle handwheel, comprising:
    a torque sensor configured to generate a first signal indicative of an amount of torque applied to the vehicle handwheel;
    a position sensor operably coupled to a steering assist motor, the steering assist motor being further operably coupled to the vehicle handwheel, the position sensor configured to generate a second signal indicative of a relative position of the vehicle handwheel; and
    a microprocessor configured to receive the first and second signals from the torque sensor and the position sensor, respectively;
    the microprocessor further configured to determine the amount of torque applied to the vehicle handwheel based on the first signal;
    the microprocessor further configured to determine a rotational speed of the vehicle handwheel based on the second signal;
    the microprocessor further configured to compare the amount of torque applied to the vehicle handwheel to a threshold torque level;
    the microprocessor further configured to compare the rotational speed of the vehicle handwheel to a threshold rotational speed;
    the microprocessor further configured to determine when both:
        (a) the amount of torque applied to the vehicle handwheel is greater than or equal to a threshold torque level, and
        (b) the rotational speed of the vehicle handwheel is less than or equal to a threshold rotational speed;
    the microprocessor further configured to set an absolute rotational position value indicating an absolute rotational position of the vehicle handwheel equal to a predetermined steering travel limit of the vehicle handwheel; and
    the microprocessor further configured to store the absolute rotational position value in a memory device.

4. The system of claim 3, wherein the predetermined steering travel limit is at least one of a predetermined clockwise steering travel limit and a predetermined counter-clockwise steering travel limit.

* * * * *